2,809,954
Patented Oct. 15, 1957

2,809,954

THERMOPLASTIC MELAMINE-SULFONAMIDE-FORMALDEHYDE RESINOUS MATERIALS AND PROCESS FOR MAKING SAME

Zenon Kazenas, East Cleveland, Ohio, assignor, by mesne assignments, to Switzer Brothers, Inc., Cleveland, Ohio, a corporation of Ohio No Drawing. Application January 26, 1954,
Serial No. 406,331

13 Claims. (Cl. 260—45.2)

The present invention relates to a new thermoplastic resin and, more particularly, to a thermoplastic co-condensation product in which one of the components is melamine, derivatives thereof or the partial condensation products thereof with an aldehyde. The present invention also relates to a new pigment composed of one or more coloring materials dispersed or dissolved in the thermoplastic resin in a finely-divided condition and to casting or coating compositions containing such pigments, such as inks and the like.

Up to the present time it has not been possible to make useful thermoplastic resins which contain melamine-aldehyde condensation products. In fact, one of the outstanding characteristics of such melamine-aldehyde resins is the hard, infusible and insoluble character thereof after having been set.

The thermoplastic resin of the present invention is a co-condensation product of a melamine, an aromatic sulfonamide and an aldehyde such as formaldehyde. The new resin has a higher softening point than the well-known sulfonamide-aldehyde resins and has some characteristics which are in no way similar to the completely condensed melamine-aldehyde resins and other characteristics which are in no way similar to the thermoplastic sulfonamide-aldehyde resins. The new resin not only has a higher melting point than the sulfonamide-aldehyde resins, but it will release solvents more rapidly than such resins and does not exhibit cold flow at room temperatures as do the sulfonamide-aldehyde resins. On the other hand, the new resin, unlike the melamine-aldehyde resins, is soluble in certain solvents and is thermoplastic. The overall character of the new resin makes it especially suitable for the manufacture of pigments. For example, the new resin can be highly colored and, even though thermoplastic, can be readily ground to a finely-divided condition at temperatures below about 100° C. Most thermoplastic resins will either soften at the temperatures encountered during grinding or will tend to ball up or agglomerate, even at temperatures below the softening point, probably due to cold flow under the pressure of the grinding elements. The new resin is brittle and friable below its softening point and is not hornlike and tough, as are most thermosetting resins. The new resin is insoluble in many common vehicles and can therefore be suspended in such vehicles without coalescence or agglomeration.

In accordance with the invention, pigments are produced from the thermoplastic resins by dispersing a color material, such as a dye, into the resin. As disclosed herein, this may be done by any of three illustrative procedures. In accordance with two of these procedures, the colored resin is recovered in massive amorphous form and then ground to the desired particle size. In accordance with the third of these procedures, the resin particles are first formed by grinding the uncolored, solid, massive resin, and these particles are dyed by immersion in an aqueous dye bath. In all three cases, the final pigment particles are formed by the grinding of a substantially non-porous, massive resin, as distinguished, for example, from merely breaking up agglomerates of fine particles produced by precipitation of the resin from a liquid solution, or the grinding of a thermosetting resin which has been cured in the solid state so as to form a relatively porous or "cheesy" mass.

By virtue of the brittle, friable character of the amorphous resins of the present invention and the lack of porosity of the resin mass at the time of grinding, the resins inherently break down with a conchoidal-like fracture that is characteristic of brittle, ground, amorphous materials, such as glass, and the resultant non-porous particles, having a minimum (or complete absence) of re-entrant surfaces, exhibit many outstanding qualities in coating compositions and particularly in printing inks. The ground resins resist subsequent agglomeration before, during, and after dispersion in a film-forming vehicle and resist settling in such vehicles to a remarkable degree. They have exceptionally low oil absorption characteristics and superior solvent release properties. They may be initially produced, stored and handled as relatively coarse sand-like particles up to the point of being mixed into a film-forming vehicle and are readily broken down to the desired ultimate particle size, without balling or agglomeration, while being ground into the vehicle on a conventional 3-roll mill or the like. And the coating compositions produced with such pigments, particularly printing inks, have exceptional working properties.

In so far as the new colored pigment is concerned, it has been found that the light-fastness of the new pigment is better than that of other colored pigments containing the same soluble dyestuffs. This characteristic renders the new resin particularly suitable for use with soluble fluorescent dyes and especially the rhodamines, the naphthalimides and the coumarins.

In this connection, a film of a known sulfonamide-aldehyde thermoplastic resin in which brilliant yellow 6G base had been incorporated showed a decided darkening after five hours in an Atlas weather-ometer. On the other hand, a film of completely condensed melamine-aldehyde resin containing the same dye showed an undesirable degree of darkening after five hours in the weather-ometer, although the darkening was not as bad as in the case of the thermoplastic resin. However, a similar film of the new thermoplastic resin, according to the present invention, with the same percentage of the same dye showed substantially no darkening after five hours in the weather-ometer.

The present thermoplastic resin may be prepared from an aromatic monosulfonamide having two reactive hydrogens, i. e., two reactive amide hydrogens, melamine or a melamine derivative having at least two functional amide groups and formaldehyde or paraformaldehyde. If desired, either or both of the first-mentioned components may be separately reacted with formaldehyde to form a thermoplastic sulfonamide-aldehyde resin or a B-stage (partially condensed) melamine-aldehyde resin, respectively, before being co-condensed. The aromatic sulfonamide may comprise a mixture of o- and p-toluene sulfonamides, benzene sulfonamide or the alkyl derivatives thereof or α toluene sulfonamide, in which the sulfonamido group is attached directly to the aromatic nucleus through the sulfur atom.

The B-stage partially condensed methylol melamine (melamine-aldehyde) resin is the water-soluble, thermofusible reaction product of melamine and formaldehyde or paraformaldehyde. In place of melamine, one can use the methyl melamine or other alkyl derivatives of melamine, such as the mono- or dialkyl derivatives where the alkyl group may be methyl, ethyl, propyl, butyl or the like.

Also the B-stage methylol melamine resin can be modified by forming the alkyl ether of the methylol melamine. This can be done by taking an A-stage methylol melamine, i. e., the tri-, tetra- or penta-methylol melamine, and then converting to the B-stage resin in the presence of an alkanol such as methanol, ethanol, propanol, butanol and the like. When using methanol, the modified B-stage resin would be the mono-, di or trimethyl ether of tri-, tetra- or pentamethylol melamine, in partially condensed form.

The relative quantities of the materials to be co-condensed are critical only to the extent that more than about 20% by weight of the unmodified melamine-formaldehyde B-stage resin in the final product will produce a thermosetting product, which is not desired, and, if too small a quantity of the melamine resin is used, the softening point of the product will differ only slightly from the softening point of the aromatic sulfonamide-formaldehyde resin. In other words, the amount by weight of the sulfonamide-aldehyde resin should be at least four times the amount of the unmodified B-stage melamine-aldehyde resin. When the unmodified melamine-formaldehyde B-stage resin is employed, it is preferred to use about 16% thereof based on the weight of the final co-condensed resin, i. e., about five times as much of the sulfonamide-aldehyde resin as the unmodified B-stage melamine-aldehyde resin. When the melamine derivatives or the modified B-stage melamine resins are used, greater relative quantities can be employed, up to about 25–35% by weight of the final product, i. e., up to about 50% by weight of the sulfonamide-aldehyde resin. Generally, when employing a melamine derivative to form the B-stage partially condensed resin, or when preparing the alkanol modified melamine resin, it is desirable to use greater quantities of formaldehyde so as to provide additional methylol groups for subsequent co-condensation with the sulfonamide-formaldehyde resin. The B-stage melamine-formaldehyde resin, i. e., the methylol melamine, must have at least two methylol groups and preferably three or four such groups in order to successfully carry out the subsequent co-condensation with the sulfonamide resin.

The various melamine derivatives having at least two functional amide groups, which are useful substitutes for melamine for the purposes of the present invention, include all of such derivatives mentioned in the foregoing discussion. Stated most simply, by way of summary, they include alkyl melamines having no more than one alkyl substituted amido nitrogen and monohydric alkanol modified methylol and alkyl methylol melamines.

As will be noted from the following Examples 2, 3, 4, and 5 on the one hand and Example 6 on the other, the resins of the present invention may be prepared using either formaldehyde or its polymer, paraformaldehyde, as reactants. This monomer and its polymer, in which the same atoms are present in the same proportion, should be distinguished from isomerides of formaldehyde, such as diformaldehyde containing a plurality of aldehyde groups in a stable molecule.

The present invention will now be described in greater detail by reference to the following examples:

*Example 1*

360 grams of mixed o- and p-toluene sulfonamide-formaldehyde resins were melted at 60°–70° C. and then heated to 125° C. At this temperature 78.4 grams of B-stage unmodified melamine-formaldehyde resin were added and dissolved therein. The solution became clear at about 150° C., and heating was continued up to 170° C. and held there for about ten minutes. Upon cooling, the co-condensed resin began to solidify at about 115° C. The product (94.5% yield) was a clear water-white resin which, below about 100° C. was brittle, friable and easily ground in a micropulverizer or by wet ball milling into a finely divided powder.

*Example 2*

180 grams of mixed o- and p-toluene sulfonamide-formaldehyde resins were melted at about 60°–70° C. and then heated up to about 130° C. 20 grams of melamine were added, and after about ten minutes the solution became clear; then 14.3 grams of paraformaldehyde were added at 120° C. The entire mixture was then heated up from 120° C. to between 170° C. and 175° C. while stirring over a thirty minute period. The mixture was then clear. Upon cooling, the resin began to solidify at about 105° C. Below 100° C. the resin, which was clear and water-white, became brittle and friable, as in Example 1.

*Example 3*

167 grams of a mixture of o- and p-toluene sulfonamide, 29.4 grams of paraformaldehyde and 39.2 grams of the B-stage unmodified melamine-formaldehyde resin were heated together to a temperature of about 170° C. for about fifteen minutes. Upon cooling, the resin began to solidify at about 115° C. The resin was clear and water-white, and below about 100° C. it was brittle and friable, as in Example 1.

*Example 4*

168 grams of a mixture of o- and p-toluene sulfonamide and 29.4 grams of paraformaldehyde were heated together to a temperature of about 170° C., while stirring, and maintained at that temperature for about twenty minutes. To this resin, at 115–120° C., were added 39 grams of the B-stage unmodified melamine-formaldehyde resin, and the mixture was heated up to 170° C. for fifteen minutes. The resin had a softening point of 115° C. and physical characteristics substantially the same as in Examples 1, 2 and 3.

*Example 5*

154.1 grams of a mixture of o- and p-toluene sulfonamide were heated to 120° C. 20.1 grams of melamine were then added and stirred at 120° C. for fifteen minutes. 41.3 grams of paraformaldehyde were added in about seven equal portions over a period of about twenty minutes while the temperature was kept at about 115–120° C. After all of the paraformaldehyde was added, the temperature was raised to 170° C. for about fifteen minutes. The product resin had a softening point of about 112° C. The resin had the physical characteristics of the resins in the foregoing examples.

*Example 6*

To 155 grams of formalin (38% concentration) was added sufficient KOH (20% solution) to adjust the pH value of the formalin to about 9. Then 168 grams of a mixture of o- and p-toluene sulfonamide was added. The mixture was heated to 100° C. and maintained at that temperature until all water had been evaporated. The temperature was then raised to 150° C. and held there for 10–15 minutes. About 180 grams of the sulfonamide-aldehyde resin was formed. To this resin, at 115° C., was added 39 grams of the B-stage melamine-aldehyde resin, and the mixture was then heated up to 170° C. with stirring and held up at that temperature for 15–20 minutes. The resulting product, as in the prior examples, softened at about 115° C. and was brittle and friable below about 100° C.

Any of the foregoing clear resins, which may have been reduced to a finely divided powder by grinding and/or milling, can be colored to form a colored resin by dissolving the resin and dye in a ketone or an ester solvent followed by evaporating the solvent. On the other hand, if desired the resin can be melted at temperatures above about 130° C. and the dye added to the melt. In either case, the colored resin can be easily reduced to a finely divided pigment form at temperatures below about 100° C.

Colored pigments can be prepared by introducing the dye during the manufacture of the resins in the manner described in the following examples. In preparing fluorescent pigments from the rhodamines, naphthalimides and/or coumarins, it is preferable that the dye be completely dissolved in the resin. Additionally, the resin may be colored by other coloring materials such as insoluble dyes, dyestuffs, organic or inorganic pigments, flatting and opacifying agents or the like by dispersing any such coloring materials in the resin.

*Example 7*

During the production of the resin as described in Example 1, a dye may be added when the mixture has reached a temperature of between 150° C. and 160° C., while heating up to 170° C. When 8.16 grams of brilliant yellow 6G base (4 amino 1,8 naphthal 2′4′ dimethyl phenylimide) and .9132 gram of rhodamine 6 GDN Extra (Color Index No. 752) are added, the final resin has an orange-yellow color which is strongly daylight fluorescent when applied to surfaces by various printing methods.

*Example 8*

If 4.02 grams of rhodamine B Extra (Color Index No. 749) and 4.02 grams of rhodamine 6 GDN Extra are added to the molten mixture of Example 1 in the manner shown in Example 7, the resulting colored resin pigment is a bluish-red which is also strongly daylight fluorescent when applied to a surface as an ink.

*Example 9*

If 12.45 grams of brilliant yellow 6G base are added in place of the dyes mentioned in Example 8, the resulting pigment will be a lemon yellow which is also highly daylight fluorescent.

*Example 10*

If If 1.37 grams of rhodamine B Extra, 2.07 grams of rhodamine 6 GDN Extra and 4.12 grams of brilliant yellow 6G base are added in place of the dyes used in Example 8, the resulting pigment is a fiery-orange and is highly daylight fluorescent.

*Example 11*

If 4.02 grams of malachite green (Color Index No. 657) are added to the resin in place of the dyes used in Example 8, the product has the characteristic green color of that dye.

*Example 12*

4.1 grams of 4-methyl-7-diethylamino coumarin were added to the resin in the manner described in Example 7. The resulting product was a colorless resin which could be easily ground to a fine powder and which gave a bright blue color when exposed to ultra-violet light.

If desired, the undyed resin may be prepared as in Examples 1 to 6 and dyed by immersion in an aqueous dye bath.

*Example 13*

A dye bath was prepared as follows:

40 cc. water
1.0 gram iso-octyl phenyl ether of polyethylene glycol, known as "Triton X–100"
10.0 cc. formic acid (90% solution)
.05 gram rhodamine B Extra
.05 gram rhodamine 6 GDN Extra The above materials were dissolved to form a 0.2% dye bath and 5 grams of the powdered resin of Example 1 were added. The dye concentration was 2% based on the weight of the resin. The dye bath and resin were warmed to a temperature not above 46° C. for three minutes, and the dyed resin was then filtered from the bath and washed with cold water until the water was substantially colorless. By comparing the color of the dyed resin and the color of a resin containing 1% of the same dyes which had been incorporated during manufacture as in Example 8, it was estimated that the resin powder contained 1% of the dye.

The pigments prepared in the manner described in the foregoing examples are insoluble in water and aliphatic hydrocarbon solvents, are practically insoluble in aromatic hydrocarbon solvents, and are soluble in ketones and solvent esters. When the pigments of Examples 7 to 12 are ground, or the resins from which they are produced are ground for subsequent dyeing to colored and/or fluorescent pigments in accordance with Example 13, the amorphous resins break down into conchoidally fractured discrete fragments which are substantially non-porous and are relatively free from re-entrant surfaces forming depressions or pockets which might tend to entrap air and thereby hinder rapid and complete surface wetting when grinding the particles into a vehicle. These non-porous resin particles, suitably dyed or colored, exhibit the many outstanding pigment qualities in coating compositions which were enumerated above.

Based on these physical characteristics, the pigments may be used in vehicles which are non-solvents for the pigments to form various types of inks and the like. If desired, the resin can be dissolved in solvent-type volatile vehicles to form coating compositions of varied properties. Also they may be used in spirit varnish compositions to which film formers such as the vinyl polymers and copolymers, cellulose acetate, etc., have been added. In such compositions, when film formers are not employed, it is generally desirable to add small percentages of conventional plasticizers so as to give the applied films sufficient flexibility.

The following example is a composition containing the new resin used as a suspended pigment for use as a silk screen ink. Percentages given are by weight:

*Example 14*

| | Percent |
|---|---|
| Long oil alkyd (soya type—50% solids) | 40.6 |
| Aluminum stearate gel | 8.6 |
| Driers (metal naphthenates) | 0.3 |
| Kerosene | 6.5 |
| Pigment as per Example 7 | 44.0 |

The above ink when applied by the silk screen process results in a bright yellow having a slightly orange tint.

*Example 15*

The resin of the present invention may also be used for coating compositions. For coating wood, the following formulation may be used:

14 grams colorless resin of Example 1
22 grams low viscosity cellulose butyrate
12 grams dioctyl phthalate plasticizer
25 grams methyl ethyl ketone
25 grams ethyl acetate
10 grams toluene
0.15 gram rhodamine B Extra
0.15 gram rhodamine 6 GDN Extra If a sprayable composition is desired, the above formulation may be thinned out with an additional 25 grams of ethyl acetate and 25 grams of toluene. The resulting coating is transparent and has a reddish color. A white or other colored primer coat may be applied to the wood before applying the resin coating so as to provide a diffusely reflecting background. Such a primer coat should be used when coating a metal or the like.

Although the present invention has been described with reference to the foregoing examples, it will be understood that various modifications will occur to those skilled in the art, and it is intended that such modifications as come within the scope of the appended claims be covered thereby.

What is claimed is:

1. A completely condensed, thermoplastic resin consisting essentially of the condensation product of a first component (A) selected from the class consisting of (a) a mixture of at least one aldehyde component entirely selected from the class consisting of formaldehyde and paraformaldehyde and at least one aromatic monosulfonamide having two reactive amide hydrogens, where the sulfonamido group is attached directly to the aromatic nucleus through the sulfur atom, and (b) a thermoplastic condensation product of the constituents of mixture (a), and a second component (B) selected from the class consisting of (c) a mixture of at least one aldehyde component entirely selected from the class consisting of formaldehyde and paraformaldehyde and at least one melamine compound selected from the class consisting of melamine, alkyl melamines having no more than one alkyl substituted amido nitrogen, and monohydric alkanol modified methylol and alkyl methylol melamines, and (d) a thermofusible partial condensation product of the constituents of mixture (c), the amount of said second component (B) being an amount, not exceeding about 50% by weight of said component (A), sufficient to render said completely condensed, thermoplastic resin substantially insoluble in aromatic hydrocarbon solvents but insufficient to render it thermosetting.

2. A completely condensed, thermoplastic resin consisting essentially of the condensation product of at least one aldehyde component entirely selected from the class consisting of formaldehyde and paraformaldehyde, at least one aromatic monosulfonamide having two reactive amide hydrogens, where the sulfonamido group is attached directly to the aromatic nucleus through the sulfur atom, and at least one melamine compound selected from the class consisting of melamine, alkyl melamines having no more than one alkyl substituted amido nitrogen, and monohydric alkanol modified methylol and alkyl methylol melamines, the amount of said melamine compound being an amount, not exceeding 50% by weight of the aromatic monosulfonamide, sufficient to render said condensation product substantially insoluble in aromatic hydrocarbon solvents but insufficient to render it thermosetting.

3. A completely condensed, thermoplastic resin according to claim 2 in which the aromatic monosulfonamide component is toluene monosulfonamide.

4. A completely condensed, thermoplastic resin according to claim 2 in which the aromatic monosulfonamide component is a mixture of o- and p-toluene monosulfonamides.

5. A completely condensed, thermoplastic resin according to claim 2 in which said melamine compound is melamine and the amount thereof does not exceed 25% by weight of the aromatic monosulfonamide.

6. A completely condensed, thermoplastic resin according to claim 2 in which the aromatic monosulfonamide component is toluene monosulfonamide and said melamine compound is melamine, the amount of said melamine not exceeding 25% by weight of the aromatic monosulfonamide.

7. A completely condensed, thermoplastic resin according to claim 2 in which the aromatic monosulfonamide component is toluene monosulfonamide and said melamine compound is melamine, the amount of said melamine not exceeding 20% by weight of the aromatic monosulfonamide.

8. A completely condensed, thermoplastic resin consisting essentially of the co-condensation product of: (a) a thermoplastic condensation product of at least one aldehyde component entirely selected from the class consisting of formaldehyde and paraformaldehyde and at least one sulfonamide component entirely selected from the class consisting of aromatic monosulfonamides having two reactive amide hydrogens, where the sulfonamido group is attached directly to the aromatic nucleus through the sulfur atom, and (b) a thermofusible resinous partial condensation product of at least one aldehyde component entirely selected from the class consisting of formaldehyde and paraformaldehyde and at least one melamine component entirely selected from the class consisting of melamine, alkyl melamines having no more than one alkyl substituted amido nitrogen, and monohydric alkanol modified methylol and alkyl methylol melamines, the amount of said thermofusible resinous partial condensation product (b) being an amount, not exceeding about 50% by weight of said thermoplastic condensation product (a), sufficient to render said co-condensation product substantially insoluble in aromatic hydrocarbon solvents but insufficient to render it thermosetting.

9. A process of producing a completely condensed, thermoplastic, resinous condensation product comprising condensing, at a temperature up to 170° C., a mixture consisting essentially of a first component (A) selected from the class consisting of (a) a mixture of at least one aldehyde component entirely selected from the class consisting of formaldehyde and paraformaldehyde and at least one aromatic monosulfonamide having two reactive amide hydrogens, where the sulfonamido group is attached directly to the aromatic nucleus through the sulfur atom, and (b) a thermoplastic condensation product of the constituents of mixture (a), and a second component (B) selected from the class consisting of (c) a mixture of at least one aldehyde component entirely selected from the class consisting of formaldehyde and paraformaldehyde and at least one melamine compound selected from the class consisting of melamine, alkyl melamines having no more than one alkyl substituted amido nitrogen, and monohydric alkanol modified methylol and alkyl methylol melamines, and (d) a thermofusible partial condensation product of the constituents of mixture (c), the amount of said second component (B) being an amount, not exceeding about 50% by weight of said first component (A), sufficient to render said completely condensed, thermoplastic, resinous condensation product substantially insoluble in aromatic hydrocarbon solvents but insufficient to render it thermosetting.

10. A process of producing a completely condensed, thermoplastic resinous condensation product comprising condensing, at a temperature up to 170° C., (A) a thermoplastic condensation product of an aldehyde component entirely selected from the class consisting of formaldehyde and paraformaldehyde and at least one sulfonamide component entirely selected from the class consisting of aromatic monosulfonamides having two reactive hydrogens, where the sulfonamido group is attached directly to the aromatic nucleus through the sulfur atom, and a second component (B) entirely selected from the class consisting of (1) a mixture of at least one aldehyde component selected from the class consisting of formaldehyde and paraformaldehyde and at least one melamine component selected from the class consisting of melamine, alkyl melamines having no more than one alkyl substituted amido nitrogen, and monohydric alkanol modified methylol and alkyl methylol melamines, and (2) a thermofusible partial condensation product of the constituents of mixture (1), the amount of said second component (B) being an amount, not exceeding about 50% by weight of said thermoplastic condensation product (A), sufficient to render said completely condensed, thermoplastic, resinous condensation product substantially insoluble in aromatic hydrocarbon solvents but insufficient to render it thermosetting.

11. A process of producing a completely condensed, thermoplastic, resinous condensation product comprising condensing, at a temperature up to 170° C., (A) a thermoplastic condensation product of an aldehyde component entirely selected from the class consisting of formaldehyde and paraformaldehyde and a mixture of o- and p-toluene monosulfonamides, and a second component (B) entirely selected from the class consisting of (1) a mixture of at least one aldehyde component selected from the class consisting of formaldehyde and paraformaldehyde and at least one melamine component selected from the class consisting of melamine, alkyl melamines having no more than one alkyl substituted amido nitrogen, and monohydric alkanol modified methylol and alkyl methylol melamines, and (2) a thermofusible partial condensation product of the constituents of mixture (1), the amount of said second component (B) being an amount, not exceeding about 50% by weight of said thermoplastic condensation product (A), sufficient to render said completely condensed, thermoplastic, resinous condensation product substantially insoluble in aromatic hydrocarbon solvents but insufficient to render it thermosetting.

12. A process of producing a completely condensed, thermoplastic, resinous condensation product comprising condensing, at a temperature up to 170° C., a mixture consisting essentially of a first component (A) entirely selected from the class consisting of (1) a mixture of at least one aldehyde component selected from the class consisting of formaldehyde and paraformaldehyde and at least one aromatic monosulfonamide having two reactive amide hydrogens, where the sulfonamido group is attached directly to the aromatic nucleus through the sulfur atom, and (2) a thermoplastic condensation product of the constituents of mixture (1), and a second component (B) consisting of a thermofusible partial condensation product of a mixture of at least one aldehyde component entirely selected from the class consisting of formaldehyde and paraformaldehyde and at least one melamine component entirely selected from the class consisting of melamine, alkyl melamines having no more than one alkyl substituted amido nitrogen, and monohydric alkanol modified methylol and alkyl methylol melamines, the amount of said second component (B) being an amount, not exceeding about 50% by weight of said first component (A), sufficient to render said completely condensed, thermoplastic resinous condensation product substantially insoluble in aromatic hydrocarbon solvents but insufficient to render it thermosetting.

13. A process for producing a completely condensed, thermoplastic, resin comprising melting a thermoplastic resinous material consisting essentially of the condensation product of an aldehyde entirely selected from the class consisting of formaldehyde and paraformaldehyde and a sulfonamide entirely selected from the class consisting of aromatic monosulfonamides having two reactive amide hydrogens, where the sulfonamido group is attached directly to the aromatic nucleus through the sulfur atom, raising the temperature of the molten condensation product to about 125° C., dissolving therein a thermofusible partial condensation product of melamine and an aldehyde entirely selected from the class consisting of formaldehyde and paraformaldehyde, raising the temperature of the resulting solution to about 170° C. for about 10 minutes, and cooling the solution to below 100° C. to solidify the resulting resinous condensation product, said thermofusible partial condensation product being incorporated in an amount, up to about one-fifth the amount of the aldehyde-sulfonamide condensation product, sufficient to render said resulting resinous condensation product substantially insoluble in aromatic hydrocarbon solvents but insufficient to render it thermosetting.

References Cited in the file of this patent

UNITED STATES PATENTS

| | | |
|---|---|---|
| 2,119,189 | Widmer | May 31, 1938 |
| 2,160,196 | Bruson et al. | May 30, 1939 |
| 2,492,855 | Fox et al. | Dec. 27, 1949 |
| 2,498,593 | Switzer | Feb. 21, 1950 |
| 2,545,716 | Thompson | Mar. 20, 1951 |
| 2,614,091 | Bauer | Oct. 14, 1952 |
| 2,734,871 | McCafferty | Feb. 14, 1956 |
| 2,769,797 | Suen et al. | Nov. 6, 1956 |

UNITED STATES PATENT OFFICE
Certificate of Correction

Patent No. 2,809,954 October 15, 1957

Zenon Kazenas

It is hereby certified that error appears in the printed specification of the above numbered patent requiring correction and that the said Letters Patent should read as corrected below.

Column 2, line 61, strike out "or a toluene sulfonamide"; line 63, after "atom" and before the period insert —, or a toluene sulfonamide —.

Signed and sealed this 28th day of January 1958.

[SEAL]

Attest:
KARL H. AXLINE,
*Attesting Officer.*

ROBERT C. WATSON,
*Commissioner of Patents.*